(12) United States Patent
Bobbitt, III et al.

(10) Patent No.: US 6,550,838 B2
(45) Date of Patent: Apr. 22, 2003

(54) CARGO BOX TAILGATE ASSEMBLY

(75) Inventors: John Thomas Bobbitt, III, Evans, GA (US); Byron J. Danielson, Martinez, GA (US); David N. Schult, North Augusta, SC (US); Steven D. Smith, Evans, GA (US)

(73) Assignee: Club Car, Inc., Evans, GA (US)

( * ) Notice: Subject to any disclaimer, the term of this patent is extended or adjusted under 35 U.S.C. 154(b) by 0 days.

(21) Appl. No.: 09/920,659

(22) Filed: Aug. 2, 2001

(65) Prior Publication Data

US 2003/0025348 A1 Feb. 6, 2003

(51) Int. Cl.[7] ................ B62D 33/033; B62D 33/03; B62D 33/037
(52) U.S. Cl. ................ 296/52; 296/57.1; 296/59; 49/389; 49/397; 292/175; 292/341.15; 292/341.17; 292/DIG. 29
(58) Field of Search .............. 296/52, 53, 57.1, 296/59, 60, 146.8, 183; 292/175, 60, 341.15, 341.17, 44, DIG. 29; 49/389, 397

(56) References Cited

U.S. PATENT DOCUMENTS

| | | | | |
|---|---|---|---|---|
| 151,023 A | * | 5/1874 | Hawker | 296/57.1 |
| 311,910 A | * | 2/1885 | Moeller | 292/175 |
| 1,548,907 A | * | 8/1925 | Schweim | 292/162 |
| 2,587,167 A | * | 2/1952 | Kelley | 49/349 X |
| 2,781,215 A | * | 2/1957 | Griffith | 292/148 |
| 2,828,059 A | | 3/1958 | Ross | |
| 3,567,274 A | * | 3/1971 | Kaptur, Jr. et al. | 16/231 |
| 3,623,764 A | * | 11/1971 | Jacobus | 16/232 |
| D247,866 S | | 5/1978 | Sandoval | |
| 4,135,747 A | * | 1/1979 | Melilli | 292/175 |
| 4,671,581 A | | 6/1987 | Faust et al. | |
| 5,039,154 A | * | 8/1991 | Lewis | 248/503 |
| 6,007,127 A | * | 12/1999 | Garofalo | 296/26.11 |
| D427,800 S | | 7/2000 | Dornbierer | |
| 2001/0024046 A1 | * | 9/2001 | Mizuta | 296/57.1 |

* cited by examiner

Primary Examiner—D. Glenn Dayoan
Assistant Examiner—Patricia L. Engle
(74) Attorney, Agent, or Firm—Michael Best & Friedrich LLP

(57) ABSTRACT

A tailgate assembly for a cargo box having a support deck and a wall structure extending therefrom. The tailgate assembly comprises a pair of brackets positioned along the wall structure at spaced apart locations and a tailgate pivotally mounted between the brackets and releasably securable to the wall structure via a latch mechanism. The tailgate assembly has a hinge assembly which allows the tailgate to be installed and removed without tools.

38 Claims, 5 Drawing Sheets

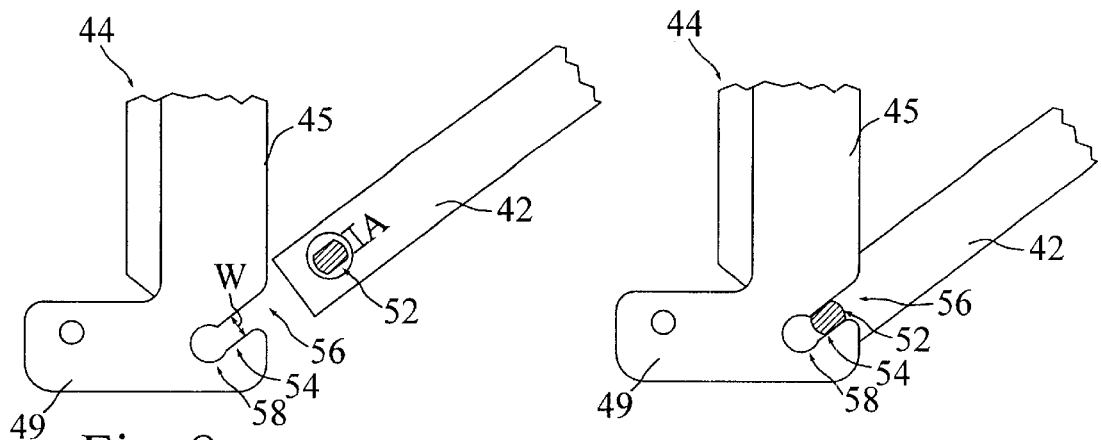
Fig. 8   Fig. 9
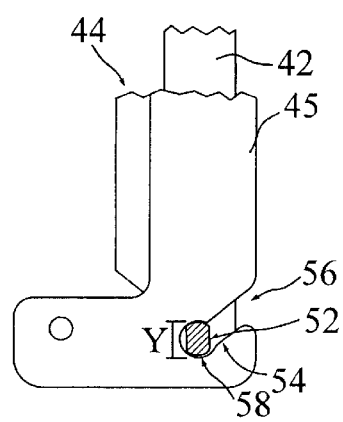
Fig. 10
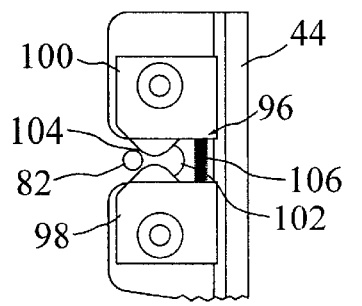 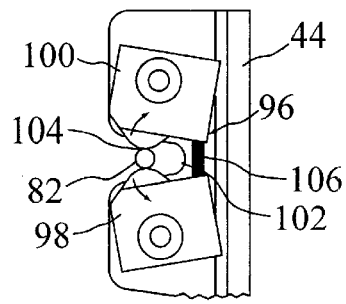 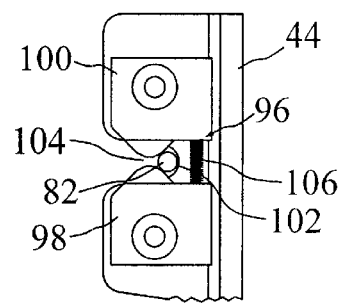
Fig. 13   Fig. 14   Fig. 15

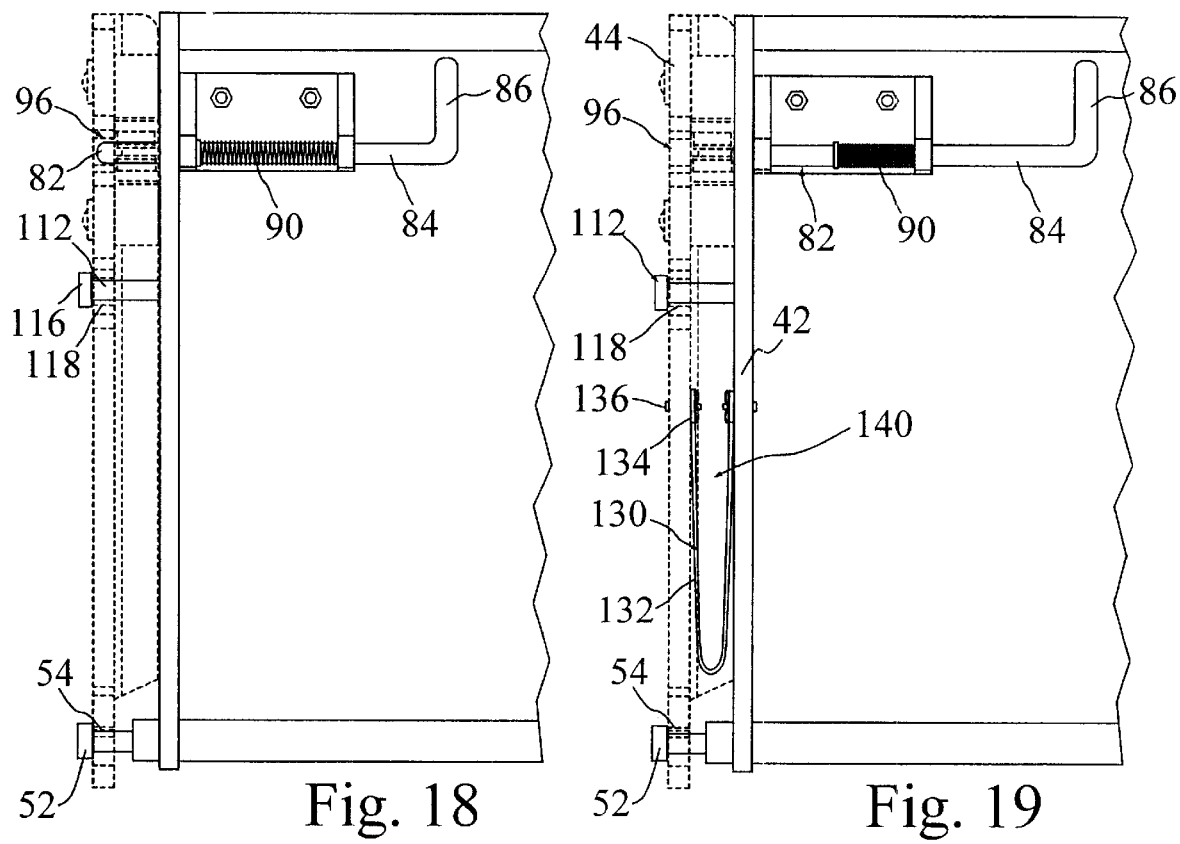
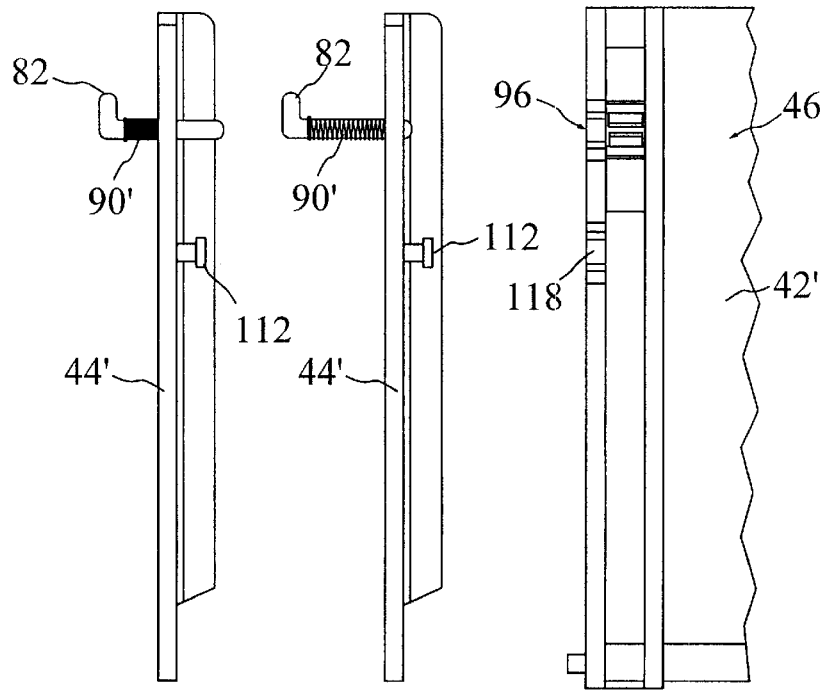

CARGO BOX TAILGATE ASSEMBLY

This application claims priority to U.S. patent application No. 29/138,704 filed Mar. 19, 2001.

BACKGROUND

The present invention relates to cargo boxes for utility vehicles and more particularly to tailgate assemblies for cargo boxes.

Many utility vehicles are provided with a cargo box for transportation of various items, for example, boxes, packages, tools, soil or debris. The cargo box generally comprises a support deck with rigid, substantially vertical walls extending therefrom about a significant extent of its perimeter. A tailgate is connected along the remainder of the perimeter to define an enclosed cargo area. The tailgate is pivotally connected such that it can be opened to allow easier loading and unloading of the cargo box.

Many prior art tailgate assemblies require hand tools to install and remove the tailgate. This can be time consuming and costly, particularly when the cargo boxes are being mass produced. Some prior art designs do allow assembly and removal without hand tools, but they generally use pins that are extended through aligned holes in the tailgate and side wall or a bracket attached thereto. Again, it can be time consuming to align the holes and insert the pin during assembly. To remove the tailgate, the pin must be pulled out, and this can be difficult if the pins rust and bind in place.

Additionally, once the tailgate is pivotally connected, a latch mechanism is utilized to lock the tailgate in a closed position. The latch mechanism should be reliable, yet easily released for opening of the tailgate. It is also desirable that the closed tailgate rigidly interconnect the side walls. This is important when a load in the cargo box applies a force to the side wall. Without such a mechanism, the end of the tailgate needs to be excessively strong to resist bending. Many existing designs incorporate the latching and stabilizing functions into a single device. However, if a load applies a force to the side wall, the force may in turn be translated to the lock mechanism which can jam the latch mechanism and prevent easy opening of the tailgate.

SUMMARY

The present invention includes a tailgate assembly for a cargo box having a support deck and a wall structure extending therefrom. The tailgate assembly comprises a pair of brackets positioned along the wall structure at spaced apart locations and a tailgate pivotally mounted between the brackets and releasably securable to the wall structure via a latch mechanism.

In a first aspect of the invention, at least one of the brackets includes a configured slot having an open entry communicating with a substantially closed retainment area and the other bracket has a receiving opening. The slot is configured such that at least a portion of the retainment area is lower than the entry. The tailgate is mounted without tools by positioning pins extending from each side of the tailgate into the receiving opening and slot.

In a second aspect of the invention, the latch mechanism includes a latch clip having opposed structures which define an opening and a retainment area. The opposed structures are biased toward one another such that the opening has a default spacing equal to X. The spacing is expandable upon application of a force upon the structures in a direction from outside the opening toward the retainment area, but nonexpandable upon application of a force upon the structures is a direction from inside the retainment area toward the opening. A pin is moveable between a rest position in which the pin is aligned with the latch clip such that the pin is passed through the opening and retained in the retainment area and a position in which the pin is clear of the latch clip such that the tailgate may rotated relative to the bracket.

In another aspect of the invention, a stabilizer assembly extends between the tailgate and each of the brackets. Each stabilizer assembly comprises a receiver slot having an outer wall surface and a pin having a shaft and a head of larger cross-sectional area. The shaft is configured to be received in the slot with the head adjacent to and overlying a portion of the outer wall surface.

BRIEF DESCRIPTION OF THE DRAWINGS

FIGS. 8–10 are partial front elevational views of a preferred bracket and tailgate of the present invention illustrating the progressive interconnection thereof.

FIGS. 13–15 are partial rear elevational views of a preferred latch clip and latch pin of the present invention illustrating the progressive interconnection thereof.

FIG. 18 is an elevational view of a preferred tailgate assembly interconnected with a preferred bracket with the latch pin in a closed position.

FIG. 19 is an elevational view of a preferred tailgate assembly interconnected with a preferred bracket with the latch pin in an open position.

FIGS. 20 and 21 are right side elevational views of the bracket of FIG. 12 with the latch pin illustrated in closed and open positions, respectively.

FIG. 22 is a partial elevational view of a tailgate incorporating components of another preferred embodiment of the present invention.

DETAILED DESCRIPTION OF THE PREFERRED EMBODIMENTS

Figure 1:
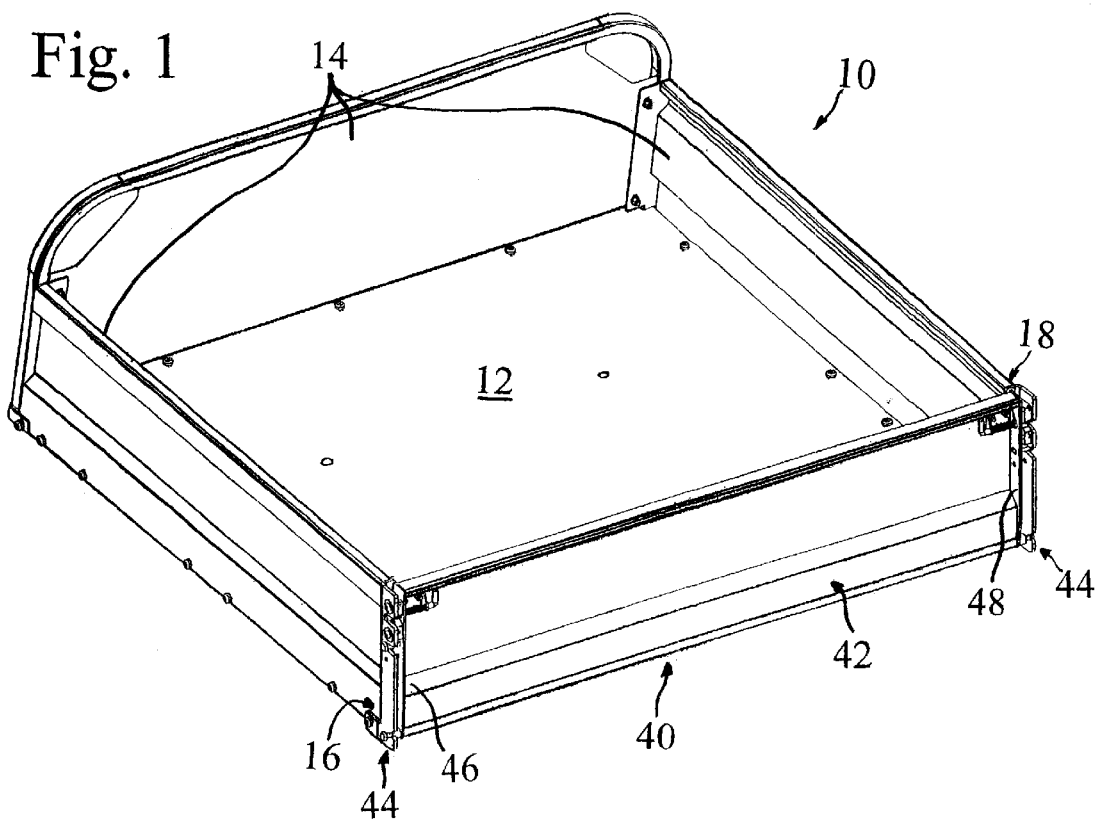
FIG. 1 is an isometric view of a cargo box incorporating a preferred embodiment of the tailgate assembly of the present invention.

The preferred embodiments of the present invention will be described with reference to the drawing figures wherein like numerals represent like elements throughout. Certain terminology, for example, "right", "left", "front", "frontward", "forward", "back", "rear" and "rearward", is used in the following description for relative descriptive clarity only and is not intended to be limiting.

Referring to FIG. 1, a cargo box 10 incorporating a preferred embodiment of the tailgate assembly 40 of the present invention is shown. The cargo box 10 generally includes a support deck 12 and a generally rigid wall structure 14 extending upwardly and perpendicularly thereto. The wall structure 14 extends between ends 16 and 18 with an open area between the ends 16, 18 defining the tailgate edge. The illustrated cargo box 10 is square with the tailgate edge extending the entire length of one of the sides of the square deck 12. However, the cargo box 10 can have any given shape and the tailgate edge does not have to extend the entire length of one of the sides. For example, the deck 12 can be rectangular with the wall structure 14 extending along three sides and each end 16, 18 extending partially onto the fourth side such that the tailgate edge is a centered portion of the fourth side.

Figure 2:
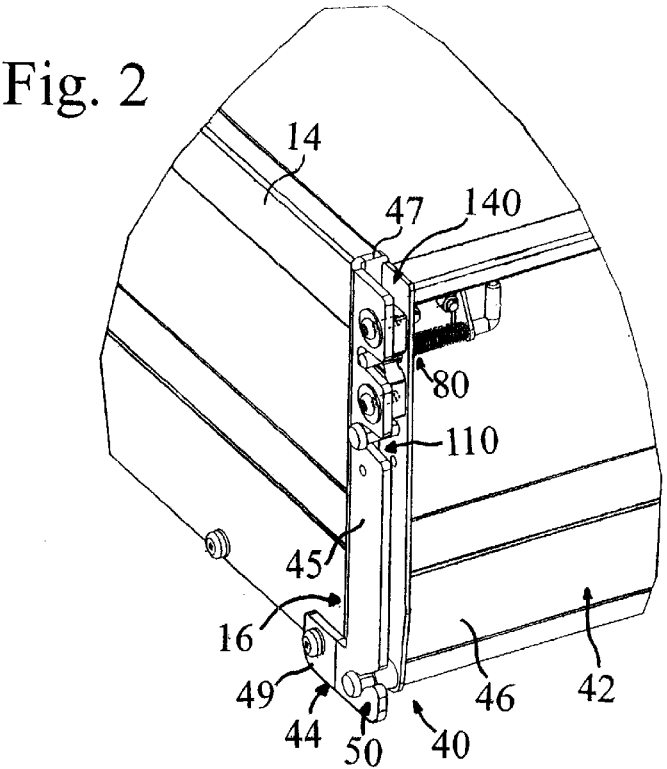
FIG. 2 is an exploded isometric view of the intersection of one of the side walls and the tailgate of FIG. 1.

Referring to FIGS. 1 and 2, the tailgate assembly 40 of the present invention generally comprises a rotatable tailgate panel 42 configured to extend between a pair of spaced apart brackets 44. The brackets 44 are preferably rigidly connected along the respective ends 16, 18 of the wall structure 14. The brackets 44 can be connected using various methods including, screws, bolts, adhesives, welding, etc. In the preferred embodiment, each bracket 44 has a body 45 with mounting flanges 47 and 49 configured for mounting to the wall structure 14. The flanges 47 and 49 can be mounted to the wall structure 14 in various manners, for example, with bolts, as illustrated through flange 49, welding (not shown), clips (not shown), receipt in a slot along the wall structure (not shown) or combinations of mounting methods. The preferred tailgate 42 and brackets 44 include a hinge assembly 50, a latch assembly 80 and a stabilizer assembly 110.

Figure 3:
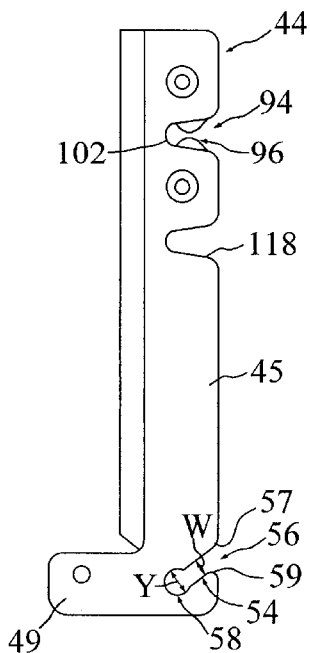
FIG. 3 is a front elevational view of a preferred bracket of the present invention.
Figure 4:
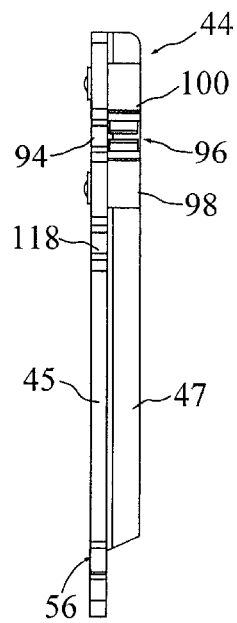
FIG. 4 is a right side elevational view of the bracket of FIG. 3.
Figure 5:
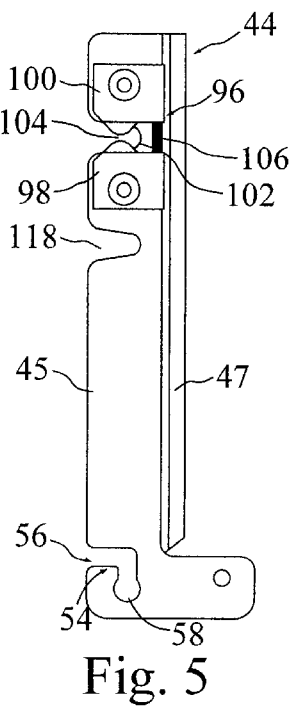
FIG. 5 is a rear elevational view of the bracket of FIG. 3 with an alternative configured slot.

Referring to FIGS. 3–10, a first embodiment of the preferred hinge assembly 50 will be described. The tailgate 42 has opposed sides 46, 48 with a hinge pin 52 extending from each side 46, 48 adjacent the lower edge of the tailgate 42. Each bracket 44 has a corresponding configured slot 54 along its vertical body 45 that is configured to receive and support a respective hinge pin 52. Each configured slot 54 has an entry 56 leading to a retainment area 58, the slot 54 configured such that the entry 56 is above at least a portion of the retainment area 58. As such, the hinge pins 52 are less likely to become inadvertently disengaged from the slots 54. The configured slot 54 illustrated in FIG. 3 is a straight slot positioned at an approximately forty-five degree angle. FIG. 5 illustrates an alternative configured slot 54 having a ninety degree bend. Other configured slot 54 configurations wherein the slot entry 56 is above at least a portion of the retainment area 58 may also be used. The configurations shown are for illustration only and are not intended to be limiting.

Figure 7:
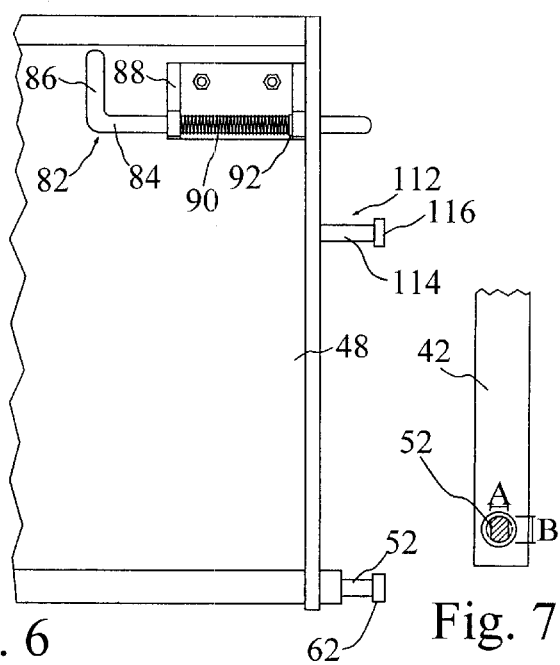
FIG. 7 is a sectional view along the line 7—7 in FIG. 6.

Due to the configuration of the slots 54, it is possible to use cylindrical hinge pins 52, however, it is preferred to utilize non-cylindrical hinge pins 52 to further minimize the chance of inadvertent disengagement. Referring to FIG. 7, the hinge pins 52 are preferably non-cylindrical such that they have at least two areas of different widths, a narrow width A and a wider width B. The illustrated pins 52 are manufactured from double D bar, that is a cylindrical bar that has two flattened sides. As can be seen in FIG. 7, the width A between the flattened sides is narrower than the width B between the arcuate sides. Other non-cylindrical material may also be used, for example, D bar, having only one flattened side, elliptical stock, or square stock with the width between the sides being narrower than the width between the corners.

In conjunction with the non-cylindrical hinge pin cross-section, the entry 56 preferably has a minimum width W which is less than the pin width B, but greater than or equal to the narrower pin width A. As such, referring to FIGS. 8 and 9, to insert the hinge pins 52, the tailgate 42 is oriented such that the narrower width A pin sides are aligned with the entry area of minimum width W. Referring to FIG. 10, the retainment area 58 has a general diameter Y that is greater than the wider pin width B, thereby allowing complete rotation of the pin 52 once it is received within the retainment area 58. Since the hinge pins 52 can pass out through the entry 56 only under limited tailgate 42 alignment, the chance for inadvertent disengagement is reduced. However, when removal of the tailgate 42 is desired, it can simply be rotated to the proper alignment and lifted off without the need for special tools or the removal of any separate pins which can become lost.

As explained above, the tailgate 42 is installed by positioning the pins 52 adjacent the slots 54 and orienting the tailgate 42 for passage of the pins through the entries 56. To facilitate such positioning and orientation, the edges 57, 59 of the entry 56 are preferably chamfered such that a funnel toward the entry 56 is defined. The funnel area is preferably wider than the wider pin width B such that the pins 52 can be received into and supported by the funnel area until the tailgate 42 is rotated to the proper orientation to allow passage through the entry 56. This allows greater ease of positioning and reduces the need for the assembler to fully support the weight of the tailgate 42 while it is oriented.

Figure 11:
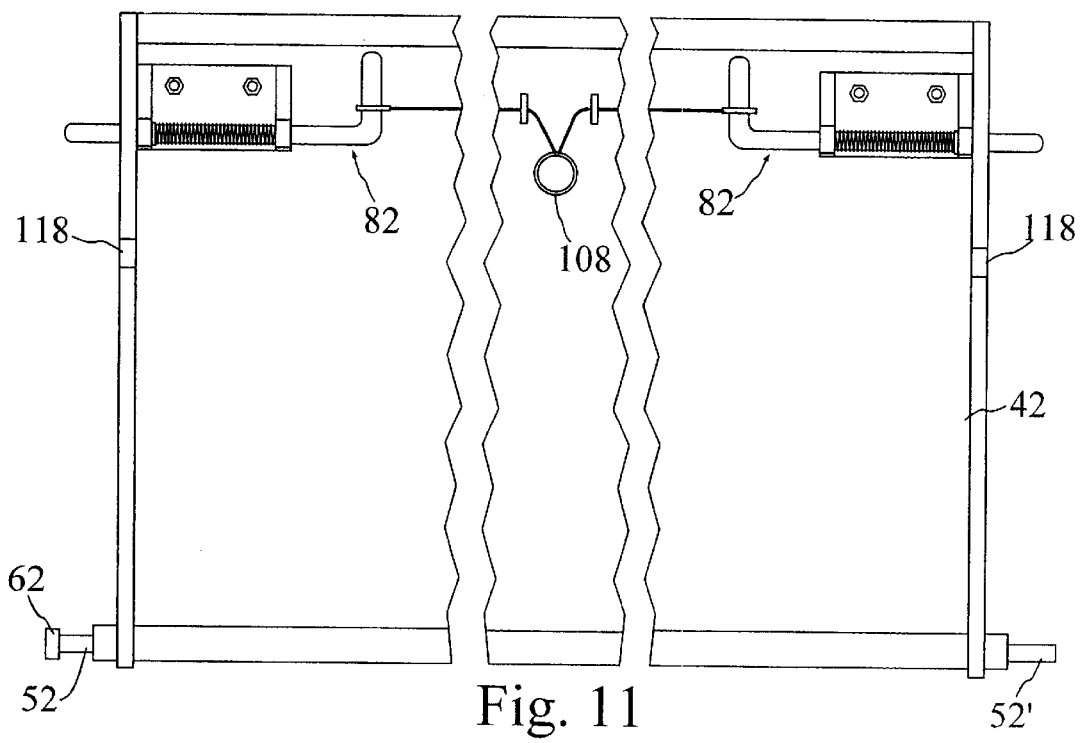
FIG. 11 is an elevational view of a tailgate incorporating components of another preferred embodiment of the present invention.
Figures 12, 16, 17:
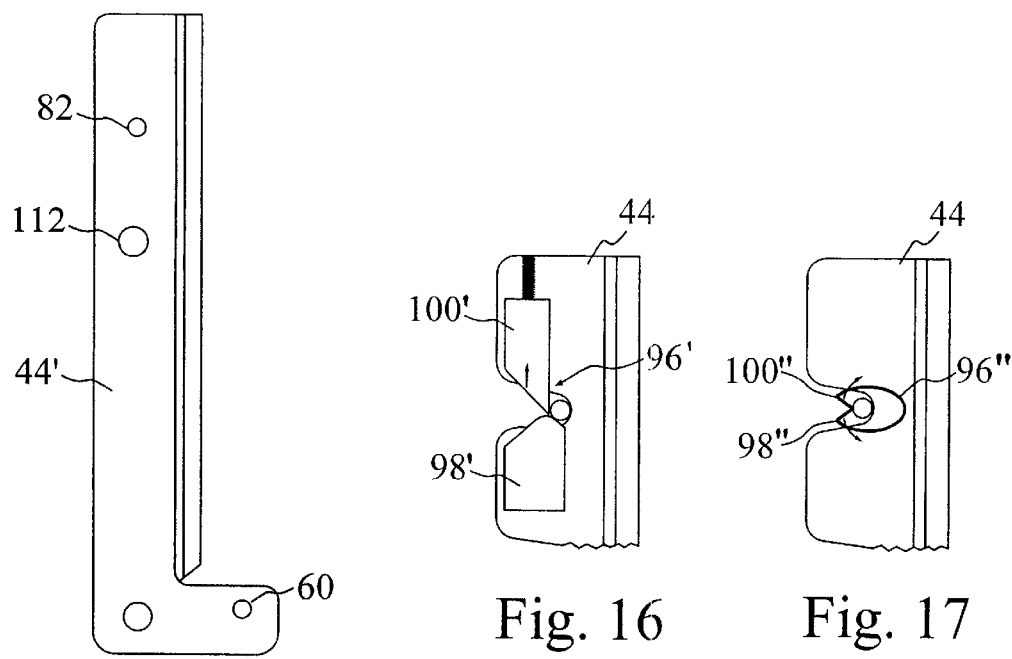
FIG. 12 is a rear elevational view of an alternative embodiment of the bracket of the present invention.
FIG. 16 is a partial rear elevational view of an alternative latch clip and latch pin.
FIG. 17 is a partial rear elevational view of another alternative latch clip and latch pin.

Referring to FIGS. 11 and 12, an alternate embodiment of the hinge assembly 50 will be described. In this embodiment, one of the brackets 44' has a hole 60 instead of a configured slot. The corresponding hinge pin 52' does not have a head such that it can be passed through the hole 60. The hinge pin 52' can be cylindrical or non-cylindrical. To attach the tailgate 42, hinge pin 52' is slid through the hole 60 and then the other hinge pin 52 is aligned with and inserted into the configured slot 54 as in the previous embodiment. Again, the tailgate 42 can be mounted and removed without tools and without any loose components.

In each of the embodiments, it is preferable, but not necessary, to provide a reduced friction material between the hinge pins 52, 52' and the corresponding slots 54 or holes 60 to reduce the wear and resistance resulting from metal on metal contact. For example, a sleeve or coating (not shown) manufactured from a reduced friction material, for example a plastic, may be positioned about each of the hinge pins 52, 52'. Alternatively, or in addition thereto, a cap or coating (not shown) may be applied along the internal edge of each slot 54 or hole 60.

Figure 6:
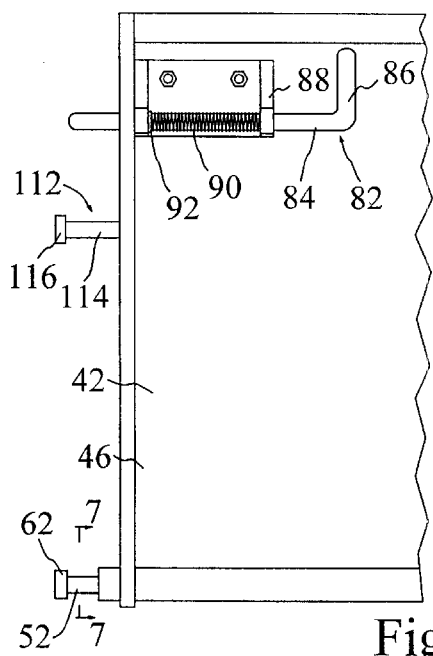
FIG. 6 is an elevational view of a tailgate incorporating components of a preferred embodiment of the present invention.

Referring to FIGS. 6 and 11, each of the hinge pins 52 that is to be received in a slot is illustrated with a head 62. The heads 62 may be provided to reduce the amount of lateral shifting of the tailgate 42, however, such heads 62 are not necessary for the general practice of the invention.

A first preferred embodiment of the latch assembly 80 will be described with reference to FIGS. 3–6 and 8–18. Referring to FIG. 6, a latch pin 82 is secured adjacent to each side 46, 48 of the tailgate 42. The preferred latch pins 82 include a shaft 84 and a handle 86. Each shaft 84 extends through a mounting bracket 88 and a spring 90 positioned between a portion of the bracket 88 and an annular shoulder 92 about the shaft 84. The spring 90 biases the latch pin 82 toward a default position in which a portion of the shaft 84 extends beyond the respective end 46, 48 of the tailgate 42.

Referring to FIGS. 3–5, each bracket 44 includes a latch slot 94 sized to receive a portion of the shaft 84 of a respective latch pin 82. A latch clip 96 is secured to each bracket 44 in alignment with a corresponding latch slot 94. The latch clip 96 includes opposed members 98, 100 extending toward one another across the slot 94. The members 98, 100 are biased toward one another and, together with the slot 94, define an enclosed retainment area 102 for the latch pin 82. An opening 104 into the retainment area 102 is defined between the opposed members 98, 100. The members 98, 100 are biased such that the default opening 104 is narrower then the width of the latch pin 82. The members 98, 100 are further configured such that they will separate, thereby expanding the opening 104, upon a force exerted on the members 98, 100 in a direction moving from outside the opening 104 toward the retainment area 102, but will not separate upon a force exerted in the opposite direction, i.e., from the retainment area 102 outward. As such, the opening 104 only allows inward passage of the latch pin 82, but not outward passage. In the embodiment illustrated in FIGS. 3–5 and 13–15, each member 98, 100 is pivotally mounted with a spring 106 therebetween. The portion of each member 98, 100 defining the opening 104 is tapered such that the force of the contacting latch pin 104 causes each member to rotate about its pivot point. In contradistinction, the taper adjacent the retainment area 102, in conjunction with the placement of the pivot point, prevents outward rotation based on an outward force from the retainment area 102. FIGS. 16 and 17 illustrate alternate embodiments of the latch clip 96' and 96", respectively. For example, the clip 96' of FIG. 16 has one stationary member 98' and one linear, spring biased member 100'. Alternatively, the latch clip 96" of FIG. 17 is a single, unitary spring clip structure defining the opposed members 98", 100". As the various embodiments illustrate, the latch clip 96 can have various structural elements, various movements and various biasing elements.

Referring to FIGS. 13–15 and 18, the tailgate 42 is secured by simply rotating the tailgate 42 until each latch pin 82 passes through the opening 104 and is secured within the retainment area 102. Closing in this sense is automatic as it is not necessary to manually align or move any of the latch assembly components. To open the tailgate 42, each latch pin 82 is pulled laterally against the force of its spring 90 until the shaft 84 clears the latch clip 96. The tailgate 42 is then free to be rotated open. Referring to FIG. 11, a single acting connector 108, for example, the illustrated pull cord or a dual pivot lever, may be interconnected between the latch pins 82 such that they are simultaneously released with a single action.

Referring to FIGS. 20–22, an alternate embodiment of the latch assembly 80 is shown. In this embodiment, each bracket 44' includes a latch pin 82 and each tailgate 42' end 46, 48 includes a corresponding latch clip 96. This embodiment operates essentially as the previous embodiment, except the latch pin springs 90' are extension springs as opposed to compression springs.

Referring to FIGS. 2–6, the preferred stabilizer assembly 110 will be described. The preferred stabilizer assembly 110 includes a pair of stabilizer pins 112 extending from opposite sides 46, 48 of the tailgate 42. Each stabilizer pin 112 has a shaft 114 and a head 116. The shaft 114 of each stabilizer pin 112 is configured to be received within a stabilizer slot 118 in the body 45 of each bracket 44. The head 116 of each stabilizer pin 112 has a larger cross-sectional area than its shaft 114 such that it overlies and engages the external surface about the slot 118, as shown in FIG. 2. By engaging the external surfaces of the brackets 44 which are connected to the ends 16, 18 of the wall structure 14, the tailgate 42 effectively rigidly interconnects the walls such that they are less susceptible to outward forces. Additionally, since the stabilizer assembly 110 is independent of the latch assembly 80, an outward force on the walls will not effect operation of the latch assembly 80. Elastomeric bumpers (not shown) may also be included between the tailgate 42 and the side walls 14 to reduce noise and vibration.

In the alternative embodiment illustrated in FIGS. 20–22, each bracket 44' includes a stabilizer pin 112 and each end 46; 48 of the tailgate 42' has a corresponding slot 118.

Referring to FIG. 19, an optional tether assembly 130 is shown. The preferred tether assembly 130 includes a steel cord 132 with eyelets 134 on each end. The ends of the cord 132 are attached to an inside surface of the bracket 44 and an outside surface of the end 46 of the tailgate 42 utilizing linch pins 138 or the like. The attached tether assembly 130 limits the extent of rotation of the tailgate 42, but is easily removed when the tailgate 42 is to be removed. Additionally, when the tailgate 42 is closed, the tether cord 132 is positioned neatly in the gap 140, see FIGS. 2 and 19, between the bracket 44 and the tailgate 42. As such, the tether cord 132 is protected from damage and does not interfere with operation of the tailgate assembly.

It will be appreciated by those skilled in the art that the hinge assembly 50, latch assembly 80 and stabilizer assembly 110 of the present invention are all included in the preferred embodiment of the present invention, however, each assembly has independent utility and can be incorporated into a tailgate assembly not incorporating the other assemblies without departing from the scope or spirit of the present invention. It will be further appreciated by those skilled in the art that changes can be made to the embodiments described above without departing from the broad inventive concept thereof. It is understood, therefore, that this invention is not limited to the particular embodiments disclosed.

What is claimed is:

1. A tailgate assembly for a cargo box having a support deck and a wall structure extending therefrom, the tailgate assembly comprising:

a pin receiving location defined along the wall structure including a slot having an open entry communicating with a substantially closed retainment area, the slot configured such that at least a portion of the retainment area is lower than the entry;

a tailgate having opposed first and second ends with a first pin extending from the first end, the first pin being configured to be removably received through the entry and into the retainment area of the slot whereby the tailgate is supported by and pivotable about the pin; and a lock mechanism configured to releasably secure the tailgate relative to the wall structure wherein the slot entry has opposed sides defining an area of first minimum width and the first pin has a noncylindrical configuration with at least a first portion having opposed sides with a first maximum width and a second portion having opposed sides with a second minimum width and wherein the first maximum width is less than or equal to the first minimum width and the second minimum width is greater than the first minimum width such that the first pin passes through the slot entry when the first pin is oriented with the first portion sides aligned with the entry passage sides defining the first minimum width and is prevented from passing through the slot entry when the first pin is oriented with the second portion sides aligned with the entry passage sides defining the first minimum width.

2. The tailgate assembly of claim 1 wherein the first pin has an axis and a D configuration in cross-section perpendicular to the axis.

3. The tailgate assembly of claim 1 wherein the first pin has an axis and a double D configuration in cross-section perpendicular to the axis.

4. The tailgate assembly of claim 1 wherein the pin receiving location is defined along a bracket secured to the wall structure.

5. The tailgate assembly of claim 4 wherein a gap is defined between an inside surface of the bracket and an outside surface of the relative end of the tailgate and a tether cord of a given length extends between the inside bracket surface and the outside tailgate surface and is configured such that the length of tether cord is within the gap when the tailgate is in a closed position.

6. The tailgate assembly of claim 1 further comprising a second pin receiving location defined along the wall structure at a position spaced from the first pin receiving location, the second pin receiving location configured to receive and support a second pin extending from the tailgate second end.

7. The tailgate assembly of claim 6 wherein each pin receiving location is defined along a bracket secured to the wall structure.

8. The tailgate assembly of claim 6 wherein the second pin receiving location includes a slot having an open entry communicating with a substantially closed retainment area and configured such that at least a portion of the retainment area is lower than the entry.

9. The tailgate assembly of claim 8 wherein each slot entry has opposed sides defining an area of first minimum width and each pin has a non-cylindrical configuration with at least a first portion having opposed sides with a first maximum width and a second portion having opposed sides with a second minimum width and wherein the first maximum width is less than or equal to the first minimum width and the second minimum width is greater than the first minimum width such that each pin passes through a respective slot entry when each pin is oriented with the first portion sides aligned with the entry passage sides defining the first minimum width and is prevented from passing through the slot entry when each pin is oriented with the second portion sides aligned with the entry passage sides defining the first minimum width.

10. The tailgate assembly of claim 9 wherein each pin has an axis and a D configuration in cross-section perpendicular to the axis.

11. The tailgate assembly of claim 9 wherein each pin has an axis and a double D configuration in cross-section perpendicular to the axis.

12. A tailgate assembly for a cargo box having a support deck and a wall structure extending therefrom, the tailgate assembly comprising:
 a pair of brackets positioned along the wall structure at spaced apart locations;
 a tailgate pivotably supported between the brackets; and
 a latch assembly extending between the tailgate and at least one of the brackets, the latch assembly comprising:
  a latch having opposed structures which define an opening and a retainment area, the opposed structures are biased toward one another such that the opening has a default spacing equal to X and the spacing is expandable upon application of a force upon the structures in a direction from outside the opening toward the retainment area, but is nonexpandable upon application of a force upon the structures is a direction from inside the retainment area toward the opening; and
  a latch pin having a first portion with a minimum width greater than X, the latch pin being moveable between a rest position in which the latch pin first portion is aligned with the latch such that it can be passed through the opening and be retained in the retainment area and a position in which the latch pin first portion is clear of the latch such that the tailgate may be rotated relative to the bracket.

13. The tailgate assembly of claim 12 wherein the tailgate has opposed ends and a latch pin is positioned adjacent each end and each bracket includes a latch.

14. The tailgate assembly of claim 13 wherein the latch pins are interconnected such that they may be simultaneously moved to the clear position.

15. The tailgate assembly of claim 12 wherein the tailgate has opposed ends and a latch is positioned adjacent each end and each bracket includes a latch pin.

16. The tailgate assembly of claim 12 wherein the latch pin is spring biased toward the rest position.

17. The tailgate assembly of claim 12 wherein each structure is pivotally mounted with a spring extending between the structures.

18. The tailgate assembly of claim 12 wherein at least one of the structures is mounted to move linearly toward and away from the other structure.

19. The tailgate assembly of claim 12 wherein the opposed structures are part of a unitary spring clip.

20. A utility vehicle comprising:
 a frame;
 wheels for supporting the frame;
 a cargo box having a support deck and a wall structure extending therefrom; and
 a tailgate assembly comprising:
  a pin receiving location defined along the wall structure including a slot having an open entry communicating with a substantially closed retainment area, the slot configured such that the retainment area is lower than the entry;
  a tailgate having opposed first and second ends with a first pin extending from the first end, the first pin being configured to be removably received through the entry and into the retainment area of the slot whereby the tailgate is supported by and pivotable about the pin; and
 a lock mechanism configured to releasably secure the tailgate relative to the wall structure
 wherein the slot entry has opposed sides defining an area of first minimum width and the first pin has a non-cylindrical configuration with at least a first portion having opposed sides with a first maximum width and a second portion having opposed sides with a second minimum width and wherein the first maximum width is less than or equal to the first minimum width and the second minimum width is greater than the first minimum width such that the first pin passes through the slot entry when the first pin is oriented with the first portion sides aligned with the entry passage sides defining the first minimum width and is prevented from passing through the slot entry when the first pin is oriented with the second portion sides aligned with the entry passage sides defining the first minimum width.

21. The utility vehicle of claim 20 wherein the first pin has an axis and a D configuration in cross-section perpendicular to the axis.

22. The utility vehicle of claim 20 wherein the first pin has an axis and a double D configuration in cross-section perpendicular to the axis.

23. The utility vehicle of claim 20 wherein the pin receiving location is defined along a bracket secured to the wall structure.

24. The tailgate assembly of claim 23 wherein a gap is defined between an inside surface of the bracket and an outside surface of the relative end of the tailgate and a tether cord of a given length extends between the inside bracket surface and the outside tailgate surface and is configured such that the length of tether cord is within the gap when the tailgate is in a closed position.

25. The utility vehicle of claim 20 further comprising a second pin receiving location defined along the wall structure at a position spaced from the first pin receiving location, the second pin receiving location configured to receive and support a second pin extending from the tailgate second end.

26. The utility vehicle of claim 25 wherein each pin receiving location is defined along a bracket secured to the wall structure.

27. The utility vehicle of claim 25 wherein the second pin receiving location includes a slot having an open entry communicating with a substantially closed retainment area and configured such that the retainment area is lower than the entry.

28. The utility vehicle of claim 27 wherein each slot entry has opposed sides defining an area of first minimum width and each pin has a non-cylindrical configuration with at least a first portion having opposed sides with a first maximum width and a second portion having opposed sides with a second minimum width and wherein the first maximum width is less than or equal to the first minimum width and the second minimum width is greater than the first minimum width such that each pin passes through a respective slot entry when each pin is oriented with the first portion sides aligned with the entry passage sides defining the first minimum width and is prevented from passing through the slot entry when each pin is oriented with the second portion sides aligned with the entry passage sides defining the first minimum width.

29. The utility vehicle of claim 28 wherein each pin has an axis and a D configuration in cross-section perpendicular to the axis.

30. The utility vehicle of claim 28 wherein each pin has an axis and a double D configuration in cross-section perpendicular to the axis.

31. The utility vehicle of claim 20 wherein the tailgate assembly further comprises a stabilizer assembly extending between each end of the tailgate and the wall structure, each stabilizer assembly comprising:

a receiver slot having an outer wall surface; and a stabilizer pin having a shaft and a head of larger cross-sectional area, the shaft configured to be received in the slot with the head adjacent to and overlying a portion of the outer wall surface.

32. A utility vehicle comprising:

a frame;

wheels for supporting the frame;

a cargo box having a support deck and a wall structure extending therefrom; and a tailgate assembly comprising:
   a pin receiving location defined along the wall structure including a slot having an open entry communicating with a substantially closed retainment area, the slot configured such that the retainment area is lower than the entry;
   a tailgate having opposed first and second ends with a first pin extending from the first end, the first pin being configured to be removably received through the entry and into the retainment area of the slot whereby the tailgate is supported by and pivotable about the pin; and a lock mechanism configured to releasably secure the tailgate relative to the wall structure wherein the lock mechanism includes a latch assembly comprising:
   a latch having opposed structures which define an opening and a second retainment area, the opposed structures biased toward one another such that the opening has a default spacing equal to X and the spacing is expandable upon application of a force upon the structures in a , direction from outside the opening toward the second retainment area, but is nonexpandable upon application of a force upon the structures is a direction from inside the second retainment area toward the opening; and
   a latch pin having a first portion with a minimum width greater than X, the latch pin being moveable between a rest position in which the latch pin first portion is aligned with the latch such that it can be passed through the opening and be retained in the second retainment area and a position in which the latch pin first portion is clear of the latch such that the tailgate may be rotated relative to the wall structure.

33. The utility vehicle of claim 32 wherein a latch pin is positioned adjacent each end of the tailgate.

34. The utility vehicle of claim 33 wherein the latch pins are interconnected such that they may be simultaneously moved to the clear position.

35. The tailgate assembly of claim 32 wherein the latch pin is spring biased toward the rest position.

36. The utility vehicle of claim 32 wherein each structure is pivotally mounted with a spring extending between the structures.

37. The utility vehicle of claim 32 wherein at least one of the structures is mounted to move linearly toward and away from the other structure.

38. The utility vehicle of claim 32 wherein the opposed structures are part of a unitary spring clip.

* * * * *